(12) United States Patent
Heine et al.

(10) Patent No.: US 12,090,616 B2
(45) Date of Patent: Sep. 17, 2024

(54) TOOL WITH COUNTER DEVICE

(71) Applicant: Fiskars Finland Oy Ab, Helsinki (FI)

(72) Inventors: Mikko Heine, Helsinki (FI); Niko Rusanen, Helsinki (FI); Mika Sokka, Helsinki (FI)

(73) Assignee: Fiskars Finland Oy Ab, Helsinki (FI)

( * ) Notice: Subject to any disclaimer, the term of this patent is extended or adjusted under 35 U.S.C. 154(b) by 0 days.

(21) Appl. No.: 17/582,178

(22) Filed: Jan. 24, 2022

(65) Prior Publication Data
US 2022/0241949 A1   Aug. 4, 2022

(30) Foreign Application Priority Data
Feb. 2, 2021   (EP) ..................................... 21154712

(51) Int. Cl.
*B25D 11/04* (2006.01)
*G01D 5/20* (2006.01)

(52) U.S. Cl.
CPC ........... *B25D 11/04* (2013.01); *G01D 5/2006* (2013.01); *B25D 2250/091* (2013.01); *B25D 2250/121* (2013.01); *B25D 2250/205* (2013.01); *B25D 2250/221* (2013.01)

(58) Field of Classification Search
CPC .............. B25D 11/04; B25D 2250/091; B25D 2250/121; B25D 2250/205; B25D 2250/221; G01D 5/2006
See application file for complete search history.

(56) References Cited

U.S. PATENT DOCUMENTS

| | | | | |
|---|---|---|---|---|
| 4,079,935 A | * | 3/1978 | Gormley | A63B 69/38 473/530 |
| 6,736,735 B2 | * | 5/2004 | Galanis | A63B 69/3614 473/221 |
| 2003/0185948 A1 | * | 10/2003 | Garwood | A23L 13/00 426/392 |

(Continued)

FOREIGN PATENT DOCUMENTS

| | | | |
|---|---|---|---|
| CN | 1543389 A | 11/2004 | |
| CN | 106426312 A * | 2/2017 | ................ B25F 1/00 |

(Continued)

OTHER PUBLICATIONS

Extended European Search Report for European Application No. 21154712.0, dated Aug. 5, 2021, 6 pages.

(Continued)

*Primary Examiner* — Andrew M Tecco
*Assistant Examiner* — Nicholas E Igbokwe
(74) *Attorney, Agent, or Firm* — FOLEY & LARDNER LLP

(57) ABSTRACT

A tool includes a tool head with a utilization surface. The tool also includes a counter device responding to an impact applied to the utilization surface. The counter device has a memory, a microcontroller controlling operation of the counter device, an indicator, and an energizer connected to the microcontroller, which in response to the impact applied to the utilization surface, produces an electric current energizing the counter device to make a modification in the memory and provide information about the cumulative count of impacts in the memory via the indicator to a user.

19 Claims, 1 Drawing Sheet

(56) References Cited

U.S. PATENT DOCUMENTS

| | | | |
|---|---|---|---|
| 2004/0259651 A1* | 12/2004 | Storek | G01P 15/00 |
| | | | 473/131 |
| 2009/0261689 A1 | 10/2009 | Fang | |
| 2016/0303443 A1* | 10/2016 | Boggs | A63B 53/14 |
| 2017/0075210 A1 | 3/2017 | Shishido et al. | |
| 2017/0246732 A1 | 8/2017 | Dey et al. | |
| 2020/0037747 A1* | 2/2020 | Khormaei | A46B 15/0044 |
| 2020/0395835 A1* | 12/2020 | Franchitti | G01H 11/06 |

FOREIGN PATENT DOCUMENTS

| | | | |
|---|---|---|---|
| CN | 108712108 A | 10/2018 | |
| CN | 211333052 U | 8/2020 | |
| WO | WO-2015/061370 A1 | 4/2015 | |

OTHER PUBLICATIONS

Office Action for Chinese Application No. 202210105233.2, dated Jun. 28, 2023, 13 pages.

* cited by examiner

TOOL WITH COUNTER DEVICE

CROSS-REFERENCE TO RELATED PATENT APPLICATIONS

This application claims the benefit of priority to European patent application number EP 21154712.0, filed on Feb. 2, 2021, the complete disclosure of which is hereby incorporated by reference for all purposes.

TECHNICAL FIELD

The present invention relates to a tool with a counter device responding to impacts applied to the tool.

BACKGROUND

Modern consumers and tool manufactures have an increased interest in the quality of the tools. For example, percussive or striking hand-powered tools, such as axes and hammers, one of such quality is durability. Percussive tools have a swift motion and they develop large short-term forces. The tools are generally manufactured to last decades or even longer. However, with plenty of use and time, even these tools have a breaking point when certain amount of impacts has been applied to the tool due to material fatigue.

The manufacturers have a general estimate how many impacts the tool can absorb and remain unbroken due to active testing in quality control. However, for a regular consumer, it is almost impossible to know the number of impacts applied to the tool without actively counting them during each use. With the knowledge of the cumulative count of the tool, the user may be more aware of the fatigue life of the tool material and pay more attention to possible localized damages to prevent final rupture of the material.

SUMMARY

An object of the present invention to provide a tool to solve the above problems. The objects of the invention are achieved by an arrangement which are characterized by what is stated in the independent claim. The preferred embodiments of the invention are disclosed in the dependent claims.

The invention is based on the idea of attaching a counter device to the tool.

An advantage of the arrangement is that the information of cumulative count of impacts of a specific tool is provided to the user who can use said information to compare it to the estimated or guaranteed number of impact be-fore material fatigue provided by the manufacturer.

BRIEF DESCRIPTION OF THE DRAWINGS

In the following the invention will be described in greater detail by means of preferred embodiments with reference to the accompanying drawings, in which.

DETAILED DESCRIPTION

Figure 1:
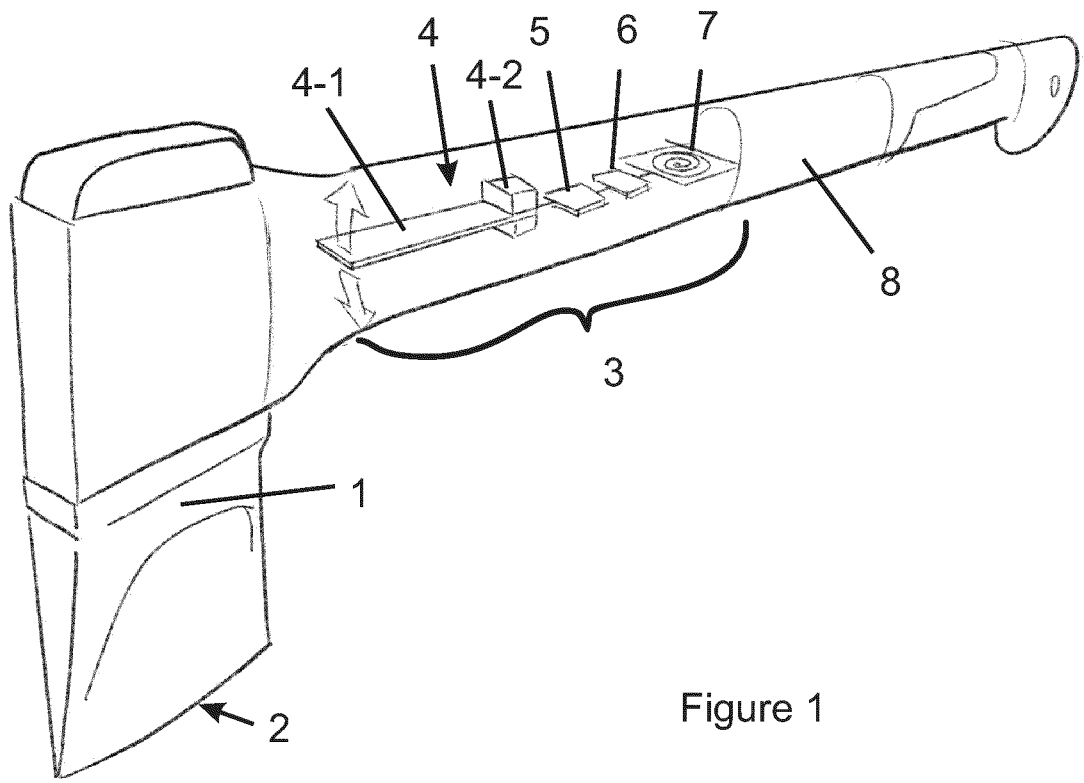
FIG. 1 illustrates a tool having a counter device according to a first embodiment.
Figure 2:
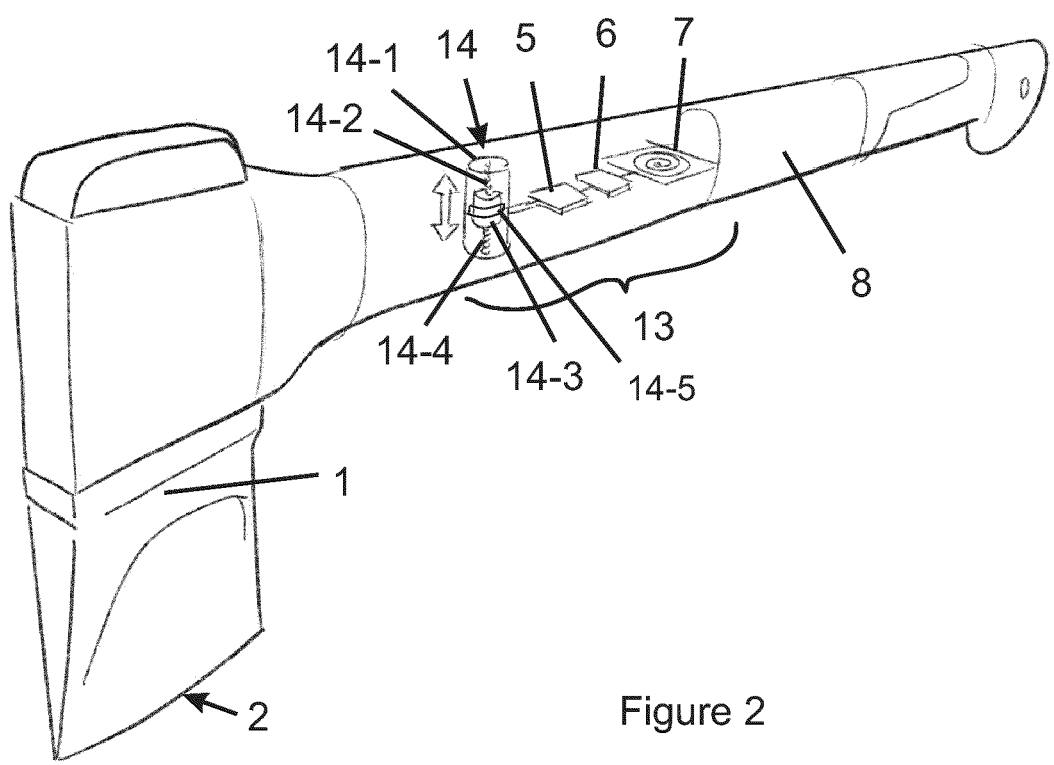
FIG. 2 illustrates a tool having a counter device according to a second embodiment.

The tool shown in FIGS. 1 and 2 is a hand-operated axe including a tool head 1 and a handle 8. The tool may also be a power tool which is actuated by additional power source and mechanism other than manually used hand tools, such as a jackhammer, for example. The tool may also be a shovel. FIG. 1 illustrates a tool comprising a counter device 3 according to a first embodiment. FIG. 2 illustrates a tool comprising a counter device 13 according to a second embodiment.

The tool head 1 can be a metal piece having at least one utilization surface 2. The utilization surface 2 in this context refers to the surface which the impact is applied to when the tool is in use. It can be a cutting edge of a blade of an axe, or a face surface of a hammer, or a shovel blade. The counter device 3, 13 is arranged to respond to an impact applied to the utilization surface 2. The impact can be any pressure that is applied to the utilization surface 2 in such a way that the applied pressure can be instantaneous or gradually increasing.

The counter device 3, 13 shown in the Figures is located inside the handle 8 such way that it is sealed inside the at least partially hollow handle 8. The counter device 3, 13 is preferably in tight contact with inner walls of the handle 8 to prevent any longitudinal, transverse and rotational movement. The counter device 3, 13 may also situate inside the tool head 1 instead of inside the handle 8. The counter device 3, 13 may be sealed in a water-tight configuration to prevent rainwater or moisture from damaging the counter device 3, 13.

The tool may be manufactured in such way that the counter device 3, 13 is enclosed inside a case which is inserted inside at least partially hollow handle 8 from the tool head end and compressed inside the handle 8 for rigid attachment. The counter device 3, 13 can also be removable from the tool using for instance a string or wire attached to the counter device 3, 13 which allows the user to pull the counter device 3, 13 out from the handle 8.

The counter device 3, 13 comprises a memory 6, a microcontroller 5 controlling operation of the counter device 3, 13, an indicator 7, and an energizer 4, 14 connected to the microcontroller 5. In response to the impact applied to the utilization surface 2 of the tool, the energizer 4, 14 is arranged to produce an electric current energizing the counter device 3, 13 to make a modification in the memory 6 and provide information about the cumulative count of impacts in the memory 6 via the indicator 7 to the user.

The memory 6 may be implemented using any suitable data storage technology, such as semiconductor-based memory devices, flash memory, magnetic memory devices and systems, optical memory devices and systems, fixed memory and removable memory. However, the preferred type of memory 6 is a non-volatile memory, such as flash memory, which is a long-term consistent storage and can retain stored information even after power is removed.

The microcontroller 5 is embedded inside the counter device 3, 13 to control the actions and features of the counter device 3, 13. A typical microcontroller 5 is a compact integrated circuit designed to govern a specific operation in an embedded system, and includes one or more communication control circuitry, such as a processor, including one or more algorithms, such as a computer program code, wherein a memory and the computer program code are con-figured, with the processor, to cause the microcontroller 5 to carry out any one of the exemplified functionalities described hereinafter on a single chip.

The indicator 7 of the counter device 3, 13 may be a transmitter providing wireless access to the information in the memory 6. The wireless access may be provided via a communication system utilising a GPRS (General Packet Radio Services), 4G or 5G mobile communication system or WLAN (Wire-less Local Area Network) or Bluetooth, for instance. The transmitter may pro-vide access to the information via a data transfer interface to one or more servers having a computer network and for instance a Uniform Resource Locator (URL) which can allow both the user and manufacturer access to the information.

In the preferred embodiment, passive Near Field Communication (NFC), passive radio-frequency identification (RFID) or passive Bluetooth may be used which do not require an additional battery or internal power source. When a passive transmitter is utilized, and the information can be accessed even after years of the last time of use. An NFC chip is made usually up of a small storage memory, radio chip and an antenna. To work, NFC chips leverage the power of an NFC reading device, such as a phone. The NFC chip picks up the de-vice's electromagnetic waves and wirelessly transfers data embedded on the chip to the phone or tablet. Passive RFID tags are powered by electromagnetic energy transmitted from a RFID reader. A battery-free Bluetooth chip can harvest energy from the ambient radio frequencies and transfer information in the memory 6 of the tool when a Bluetooth device is within its connection range.

In some embodiments, the indicator 7 may also comprise a data transfer port, such as Universal Serial Bus (USB) connector port, to provide access with a wire to the infor-mation in the memory 6. Said USB port may locate at the circumference of the handle 2 or at the end of the handle 2.

The information provided from the counter device 3, 13 may include an identification of the specific tool and the cumulative count of impacts which has been applied to the utilization surface 2 of the tool and optionally estimate of number of impacts provided from the manufacturer when risk for the material fatigue may increase. When the user receives the information, the user may be-come more aware of the tool life and pay attention to the tool material and no-tice possible cracks and other damages on the tool.

In another embodiment, the indicator 7 of the counter device 3, 13 may be arranged to indicate via visual or sound signal when the impact has been applied to the utilization surface 2. The indicator 7 may comprise a light or a display located on the tool which will be turned on in response to the impact. The indicator 7 may comprise a sound source which will emit a sound in response to the impact.

The energizer 4 in FIG. 1 is a piezo energy harvester 4 which is arranged to convert kinetic energy in the form of impact into electrical energy. The piezoelectric energy harvesting technique is based on the materials' property of generating an electric field when a mechanical force is applied. The piezo energy harvester 4 may comprise a piezoelectric beam 4-1 having a cantilever-type structure with one or two piezoelectric layers mounted on a substrate layer, and metal layers as electrodes for transferring the electrons from the piezoelectric material to the microcontroller 5. A first end of the piezoelectric beam 4-1 can be fixed on a beam holder 4-2 with screws or other suitable fasteners. The piezoelectric beam 4-1, in response to the impact, is arranged to bend and produce the electric current. The generated charges can be transferred into the microcontroller 5 by wires on the beam holder 4-2. A proof mass (not shown in Fig.) may be attached to second end of the piezoelectric beam 4-1 which, in response to the impact, bends the piezoelectric beam 4-1 and produces the electric current. The proof mass decreases the resonance frequency and increases the strain along the beam to increase the output electric charges.

The piezoelectric beam 4-1 is positioned in such way that the piezoelectric beam 4-1 is bending along the tangent to the trajectory at the impact of the utilization surface 2 of the tool head 1. The bending direction also applies when the tool has more than one utilization surface 2, such as in sledgehammers and shovels. However, if the tool is dropped side first, which is not along the bending direction, no electric current is produced and therefore, no modification of the cumulative count is made into the memory 6.

In some instances, the counter device 3, 13 may make the modification of the cumulative count when the impact force reaches above a predetermined value, which can differ depending on the tool. For smaller tools, such as claw hammer, the predetermined value can be smaller such as 2 kN, while for bigger tools, such as sledgehammer, the predetermined value can be bigger such as 5 kN.

FIG. 2 illustrates a tool comprising a counter device 13 according to a second embodiment. The embodiment of FIG. 2 is very similar to the one explained in connection with FIG. 1. Therefore, the embodiment of FIG. 2 is in the following mainly explained by pointing out differences.

The energizer 14 in FIG. 2 is an electromagnetic energy harvester 14 converting flow energy into electrical energy by electromagnetic induction. Electromagnetic, which is sometimes called electrodynamic, energy harvesting is based on Faraday's law of electromagnetic induction which is a combination of an electromagnetic coil 14-5 and a magnet 14-3 with a relative velocity between them. The electromagnetic energy harvester 14 may comprise a housing 14-1, which contains a first spring 14-2 with its first end connected to the first inner wall of the housing 14-1 and its second end connected to the magnet 14-3. Additionally, a second spring 14-4 with its first end may be connected to the second inner wall opposite the first inner wall and its second end connected to the opposite side of the same magnet 14-3. However, in some embodiments, only one spring may be provided.

The electromagnetic coil 14-5 may surround the magnet 14-3 so the magnet 14-3 can pass through the coil 14-5, or the magnet 14-3 may situate above or below the coil 14-5, wherein the magnet 14-3, in response to the impact, moves in relation to the coil 14-5 and produces the electric current. The position of the coil 14-5 and magnet 14-3 may change. For instance, the coil 14-5 may be attached to the second end of the spring 14-2 and the magnet 14-3 is fixedly connected to the inner wall of the housing 14-1.

In FIGS. 1 and 2, the counter device 3, 13 is arranged inside the handle 8. However, in some embodiments, the counter device 3, 13 may also be arranged inside the tool head 1 or rigidly attached to the tool head 1. The counter device 3, 13 may alternatively be rigidly attached to the top or side of the handle 8 in longitudinal direction.

In yet another embodiment, the tool further comprises a specific optical identification mark of the tool on the visible surface of the tool, wherein the optical identification mark is linked to an URL with the access to the information in the memory. Such specific optical identification mark can be a QR or a bar code or a series of numbers and/or letters, for example.

What is claimed is:
1. A tool being a hammer, axe, or shovel, comprising a tool head with more than one utilization surface,
wherein the tool further comprises a counter device responding to an impact applied to each of the utilization surfaces, wherein the counter device comprises:

a memory, a microcontroller controlling operation of the counter device, an indicator, an energizer connected to the microcontroller, which in response to the impact applied to each of the utilization surfaces, produces an electric current energizing the counter device to make a modification in the memory and provide information about the cumulative count of impacts in the memory via the indicator to a user;

wherein the counter device is sealed inside an at least partially hollow handle of the tool in such a way that the energizer is located between the tool head and the middle of the handle.

2. A tool according to claim 1, wherein the energizer is a piezo energy harvester converting kinetic energy in the form of impact into electrical energy, wherein the piezo energy harvester comprises a piezoelectric beam, a beam holder connected to the first end of piezoelectric beam, wherein the piezoelectric beam, in response to the impact, bends and produces the electric current.

3. A tool according to claim 1, wherein the energizer is an electromagnetic energy harvester converting flow energy into electrical energy by electromagnetic induction, wherein the electromagnetic energy harvester comprises a housing, a spring with first end connected to the inner wall of the housing, a magnet connected to the second end of the spring, a coil, wherein the magnet, in response to the impact, moves in relation to the coil and produces the electric current.

4. A tool according to claim 1, wherein the memory is a non-volatile memory.

5. A tool according to claim 1, wherein the indicator provides a visual signal.

6. A tool according to claim 1, wherein the indicator is a transmitter and provides wireless access to the information in the memory.

7. A tool according to claim 6, wherein the transmitter is one of NFC, RFID or Bluetooth systems.

8. A percussive or hand-powered striking tool according to claim 1, wherein the information includes an identification of the tool and the cumulative count of impacts which has been applied to the utilization surface of said tool.

9. A tool according to claim 1, wherein the counter device makes the modification by adding to the cumulative count if the impact is from along a tangent to trajectory of the tool head.

10. A tool according to claim 1, wherein the counter device makes the modification by adding to the cumulative count when the impact force reaches above a predetermined value.

11. A tool according to claim 1, wherein the tool further comprises a specific optical identification mark of the tool on the visible surface of the tool, wherein the optical identification mark is linked to an URL with the access to the information in the memory.

12. A percussive or hand-powered striking tool according to claim 1, wherein the tool is a hand-operated percussive tool.

13. A tool according to claim 1, wherein the counter device is compressed within the at least partially hollow handle for rigid attachment.

14. A tool according to claim 1, wherein the counter device further comprises a string or a wire such that a user can remove the counter device from the at least partially hollow handle.

15. A tool according to claim 1, wherein the indicator comprises a light or a display located on the tool which will turn on in response to an impact.

16. A tool according to claim 1, wherein the indicator comprises a sound source which will emit a sound in response to an impact.

17. A tool being a hammer, axe, or shovel, comprising:

a tool head with more than one utilization surface;

an at least partially hollow handle coupled to the tool head;

a counter device responding to an impact applied to each of the utilization surfaces and compressed within the at least partially hollow handle for rigid attachment, wherein the counter device comprises:

a memory, a microcontroller controlling operation of the counter device, an indicator, and an energizer connected to the microcontroller, which in response to the impact applied to each of the utilization surfaces, produces an electric current energizing the counter device to make a modification in the memory and provide information about the cumulative count of impacts in the memory via the indicator to a user.

18. A tool according to claim 17, wherein the energizer is a piezo energy harvester converting kinetic energy in the form of impact into electrical energy, wherein the piezo energy harvester comprises a piezoelectric beam, a beam holder connected to the first end of piezoelectric beam, wherein the piezoelectric beam, in response to the impact, bends and produces the electric current.

19. A tool according to claim 17, wherein the energizer is an electromagnetic energy harvester converting flow energy into electrical energy by electromagnetic induction, wherein the electromagnetic energy harvester comprises a housing, a spring with first end connected to the inner wall of the housing, a magnet connected to the second end of the spring, a coil, wherein the magnet, in response to the impact, moves in relation to the coil and produces the electric current.

* * * * *